US012502521B2

(12) United States Patent
Siess et al.

(10) Patent No.: US 12,502,521 B2
(45) Date of Patent: Dec. 23, 2025

(54) INTRAVASCULAR BLOOD PUMP

(71) Applicant: ABIOMED, Inc., Danvers, MA (US)

(72) Inventors: Thorsten Siess, Aachen (DE); Jimpo Wang, Danvers, MA (US); Gerd Bruno Spanier, Aachen (DE); Dion Mraz, Danvers, MA (US)

(73) Assignee: ABIOMED, Inc., Danvers, MA (US)

( * ) Notice: Subject to any disclaimer, the term of this patent is extended or adjusted under 35 U.S.C. 154(b) by 0 days.

(21) Appl. No.: 17/946,334

(22) Filed: Sep. 16, 2022

(65) Prior Publication Data

US 2023/0086096 A1 Mar. 23, 2023

Related U.S. Application Data

(60) Provisional application No. 63/245,339, filed on Sep. 17, 2021.

(51) Int. Cl.
*A61M 60/135* (2021.01)
*A61M 60/13* (2021.01)
*A61M 60/216* (2021.01)
*A61M 60/414* (2021.01)
*A61M 60/416* (2021.01)
(Continued)

(52) U.S. Cl.
CPC .......... *A61M 60/135* (2021.01); *A61M 60/13* (2021.01); *A61M 60/216* (2021.01); *A61M 60/414* (2021.01); *A61M 60/416* (2021.01); *A61M 60/808* (2021.01); *A61M 60/857* (2021.01); *A61M 60/422* (2021.01)

(58) Field of Classification Search
CPC .. A61M 60/135; A61M 60/13; A61M 60/216; A61M 60/422; A61M 60/808; A61M 60/857; A61M 60/414; A61M 60/221; A61M 60/416; A61M 60/865; A61M 60/122; A61M 60/174
See application file for complete search history.

(56) References Cited

U.S. PATENT DOCUMENTS

| | | | | |
|---|---|---|---|---|
| 5,888,241 A | * | 3/1999 | Jarvik | A61M 60/221 |
| | | | | 600/16 |
| 5,924,975 A | * | 7/1999 | Goldowsky | A61M 60/148 |
| | | | | 600/16 |

(Continued)

FOREIGN PATENT DOCUMENTS

| | | | | |
|---|---|---|---|---|
| CA | 2701809 A1 | * | 4/2009 | ............ A61M 1/101 |
| CN | 215309683 U | * | 12/2021 | |

(Continued)

OTHER PUBLICATIONS

International Search Report and Written Opinion for Application No. PCT/US2022/043754 dated Jan. 3, 2023 (11 pages).

(Continued)

*Primary Examiner* — Jennifer Pitrak McDonald
*Assistant Examiner* — Christine Sison
(74) *Attorney, Agent, or Firm* — BOTOS CHURCHILL IP LAW LLP (57) ABSTRACT

An improved intravascular blood pump. Intravascular blood pumps using the present technology may be powered by an onboard motor unit configured to be located inside the patient's body, but which is separated from the pump unit by a flexible intermediate section housing a flexible drive shaft.

20 Claims, 8 Drawing Sheets

(51) Int. Cl.
*A61M 60/422* (2021.01)
*A61M 60/808* (2021.01)
*A61M 60/857* (2021.01)

(56) References Cited

U.S. PATENT DOCUMENTS

| | | | |
|---|---|---|---|
| 6,217,541 B1* | 4/2001 | Yu | A61M 60/174 |
| | | | 604/9 |
| 7,027,875 B2* | 4/2006 | Siess | A61M 60/865 |
| | | | 607/116 |
| 7,841,976 B2 | 11/2010 | McBride et al. | |
| 9,364,593 B2 | 6/2016 | Mcbride et al. | |
| 11,679,250 B2* | 6/2023 | Alexander | A61M 60/88 |
| | | | 600/16 |
| 2004/0241019 A1* | 12/2004 | Goldowsky | A61M 60/816 |
| | | | 417/423.12 |
| 2007/0156006 A1* | 7/2007 | Smith | A61M 60/216 |
| | | | 600/16 |
| 2015/0141842 A1* | 5/2015 | Spanier | A61M 60/237 |
| | | | 600/478 |
| 2017/0119945 A1* | 5/2017 | Neumann | A61M 60/13 |
| 2018/0264183 A1* | 9/2018 | Jahangir | A61M 60/148 |
| 2020/0405926 A1 | 12/2020 | Alexander et al. | |

FOREIGN PATENT DOCUMENTS

| | | | | |
|---|---|---|---|---|
| DE | 102007014224 A1 * | 9/2008 | | F04D 13/0626 |
| WO | WO-2019035804 A1 * | 2/2019 | | A61M 60/135 |
| WO | 2020003110 A2 | 1/2020 | | |
| WO | WO-2020132211 A1 * | 6/2020 | | A61M 60/13 |

OTHER PUBLICATIONS

International Preliminary Report on Patentability for corresponding International Application No. PCT/US2022/043754 dated Mar. 28, 2024 (8 pp.).

Invitation to respond to Written Opinion in corresponding Singaporean Patent Application No. 11202400995W, dated Mar. 14, 2025 (8 pp.).

Office Action from corresponding New Zealand Patent Application No. 808649 dated Oct. 1, 2025 (4 pp.).

* cited by examiner

INTRAVASCULAR BLOOD PUMP

CROSS-REFERENCE TO RELATED APPLICATIONS

This application claims priority to, and the benefit of, U.S. Provisional Application No. 63/245,339, filed Sep. 17, 2021, the entire disclosure of which is hereby incorporated by reference herein.

BACKGROUND

Intravascular blood pumps can be introduced into a patient either surgically or percutaneously and used to deliver blood from one location in the heart or circulatory system to another location in the heart or circulatory system. For example, when deployed in the left heart, an intravascular blood pump can pump blood from the left ventricle of the heart into the aorta. Likewise, when deployed in the right heart, an intravascular blood pump can pump blood from the inferior vena cava into the pulmonary artery. Intravascular blood pumps can be powered by a motor located outside of the patient's body via an elongate drive shaft or by an onboard motor located inside the patient's body. Some intravascular blood pumps can operate in parallel with the native heart to supplement cardiac output and partially or fully unload components of the heart. Examples of such systems include the IMPELLA® family of devices (Abiomed, Inc., Danvers Mass.).

BRIEF SUMMARY

The present technology relates to intravascular blood pumps. In that regard, intravascular blood pumps using the present technology are powered by an onboard motor configured to be located inside the patient's body, but which is separated from the pump unit by a flexible intermediate section housing a flexible drive shaft. This arrangement provides a number of advantages compared to existing intravascular blood pumps. For example, in intravascular blood pumps using an onboard motor unit in which the motor housing is rigidly connected to the pump housing, the combined length of the motor housing and pump housing may prevent the intravascular blood pump from being able to pass through various portions of a patient's vasculature that include tight bends (e.g., the aortic arch). Thus, in order to minimize the combined length of the motor housing and pump housing in intravascular blood pumps where the two are rigidly connected, designers may be forced to reduce one or both of those housings to sizes that are otherwise not ideal for providing required motor performance and/or cooling characteristics. In contrast, separating the motor housing from the pump housing allows both to be optimized for their various functions (e.g., each housing may be longer than would be feasible if the housings were rigidly connected), while the flexible intermediate section allows the motor housing and pump housing to bend relative to each other in order to allow the pump to navigate tight areas of a patient's anatomy. For example, the present technology may enable the motor (and its housing) to be made narrower and longer while retaining or exceeding the same power output, thus allowing the overall diameter of the intravascular blood pump to be reduced. Likewise, although there are intravascular blood pumps which employ external motors located outside the patient's body, such designs require long drive shafts that may incur substantial driveline losses (e.g., as much as 50%). In contrast, by using an internal motor connected to the pump housing, a relatively short drive shaft may be used which incurs far lower losses, while avoiding many of the design complications associated with externally driven pump designs.

In one aspect, the disclosure describes an intravascular blood pump, comprising: a motor unit comprising a motor, the motor unit being configured to be inserted into vasculature of a patient; a pump unit comprising an impeller, the impeller being configured to pump blood when driven in rotation within the patient; and a flexible intermediate section arranged between the motor unit and the pump unit, the flexible intermediate section comprising a flexible drive shaft, wherein the flexible drive shaft is configured to be driven in rotation by the motor, and to thereby drive the impeller in rotation. In some aspects, the motor unit comprises a motor housing, the pump unit comprises a pump housing, and the flexible intermediate section connects the motor housing and the pump housing. In some aspects, the pump unit is configured to be compressible. In some aspects, the intravascular blood pump further comprises a cannula with at least one blood outflow aperture, the cannula being configured to carry blood from the pump unit to the at least one blood outflow aperture when the impeller is driven in rotation within a patient. In some aspects, the motor unit and the flexible intermediate section are arranged within the cannula. In some aspects, the intravascular blood pump further comprises a compression sleeve or compression catheter configured to maintain at least a portion of the pump unit in a compressed state. In some aspects, the cannula is configured to be compressible. In some aspects, the impeller is configured to be compressible. In some aspects, the impeller is further configured to have a compressed state and a relaxed state, and to expand when it is brought from the compressed state into the relaxed state. In some aspects, the flexible intermediate section further comprises a sheath surrounding at least a portion of the flexible drive shaft. In some aspects, the sheath comprises multiple layers. In some aspects, the flexible intermediate section further comprises a helical wire bearing arranged within the sheath and wound around the flexible drive shaft. In some aspects, the motor unit comprises a housing formed at least in part of a magnetically conductive iron-chromium-aluminum alloy. In some aspects, the motor unit comprises a housing formed at least in part of a magnetically conductive cobalt-iron alloy. In some aspects, the motor unit has a maximum outer diameter of 10 Fr. In some aspects, the motor unit has a total length of between 14 and 16 mm. In some aspects, the motor unit has a maximum external diameter and a total length, the maximum external diameter of the motor unit being between 0.20 and 0.24 of the total length of the motor unit. In some aspects, the intravascular blood pump is an intravascular blood pump configured for use in a left heart. In some aspects, the intravascular blood pump is an intravascular blood pump configured for use in a right heart.

In another aspect, the disclosure describes an intravascular blood pump, comprising: a motor unit comprising a motor, the motor unit being configured to be inserted into vasculature of a patient; a pump unit comprising an impeller, the impeller being configured to pump blood when driven in rotation within the patient; and a flexible drive shaft configured to be driven in rotation by the motor, and to thereby drive the impeller in rotation. In some aspects, the impeller is configured to have a compressed state and a relaxed state, and to expand when it is brought from the compressed state into the relaxed state.

DETAILED DESCRIPTION

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to employ the present disclosure in other suitable structures.

To provide an overall understanding of the systems, methods, and devices described herein, certain illustrative examples will be described. Although various examples may describe intravascular blood pump assemblies, it will be understood that the improvements of the present technology may also be adapted and applied to other types of intravascular blood pumps and related medical devices such as cardiac therapy and cardiac assist devices, including cardiac assist devices implanted using a surgical incision.

Figure 1:
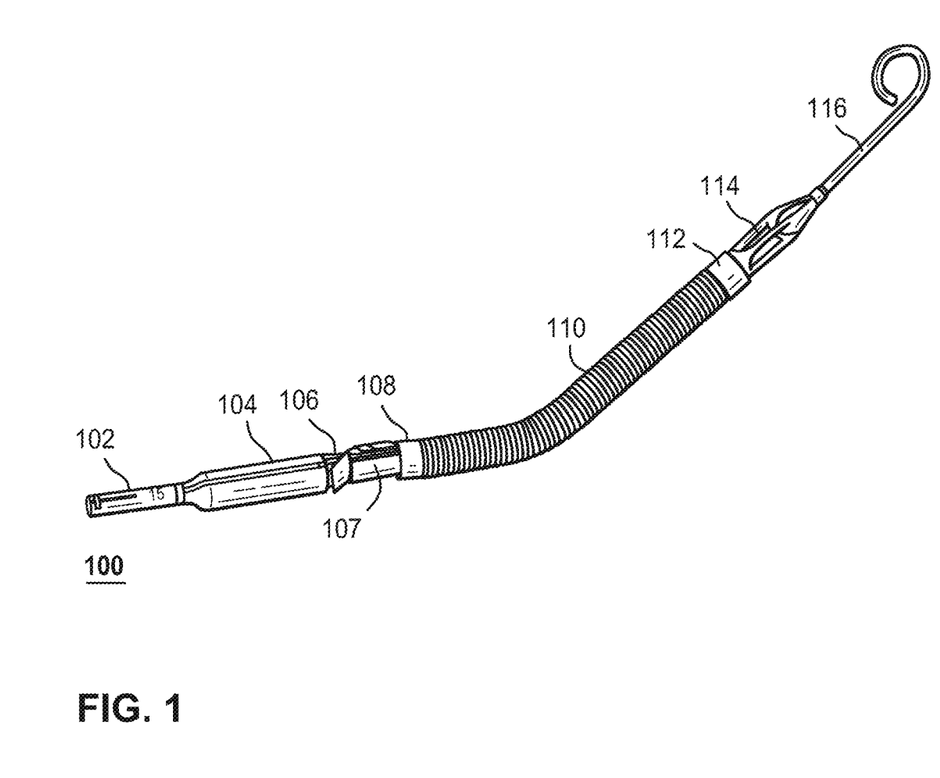
FIG. 1 depicts a conventional intravascular blood pump configured for left heart support.

FIG. 1 depicts a conventional intravascular blood pump 100 adapted for left heart support. In that regard, the intravascular blood pump 100 includes an elongate catheter 102, a motor 104, a cannula 110, a blood inflow cage 114 arranged at or near the distal end 112 of the cannula 110, a blood outflow cage 106 arranged at or near the proximal end 108 of the cannula 110, and an atraumatic extension 116 arranged at the distal end of the blood inflow cage 114. Motor 104 is configured to rotatably drive an impeller (not shown) within the pump housing 107, thereby generating suction sufficient to draw blood into cannula 110 through the blood inflow cage 114, and to expel the blood out of cannula 110 through the blood outflow cage 106. In this conventional intravascular blood pump 100, the motor 104 is directly and rigidly connected to the pump housing 107.

Figure 2:
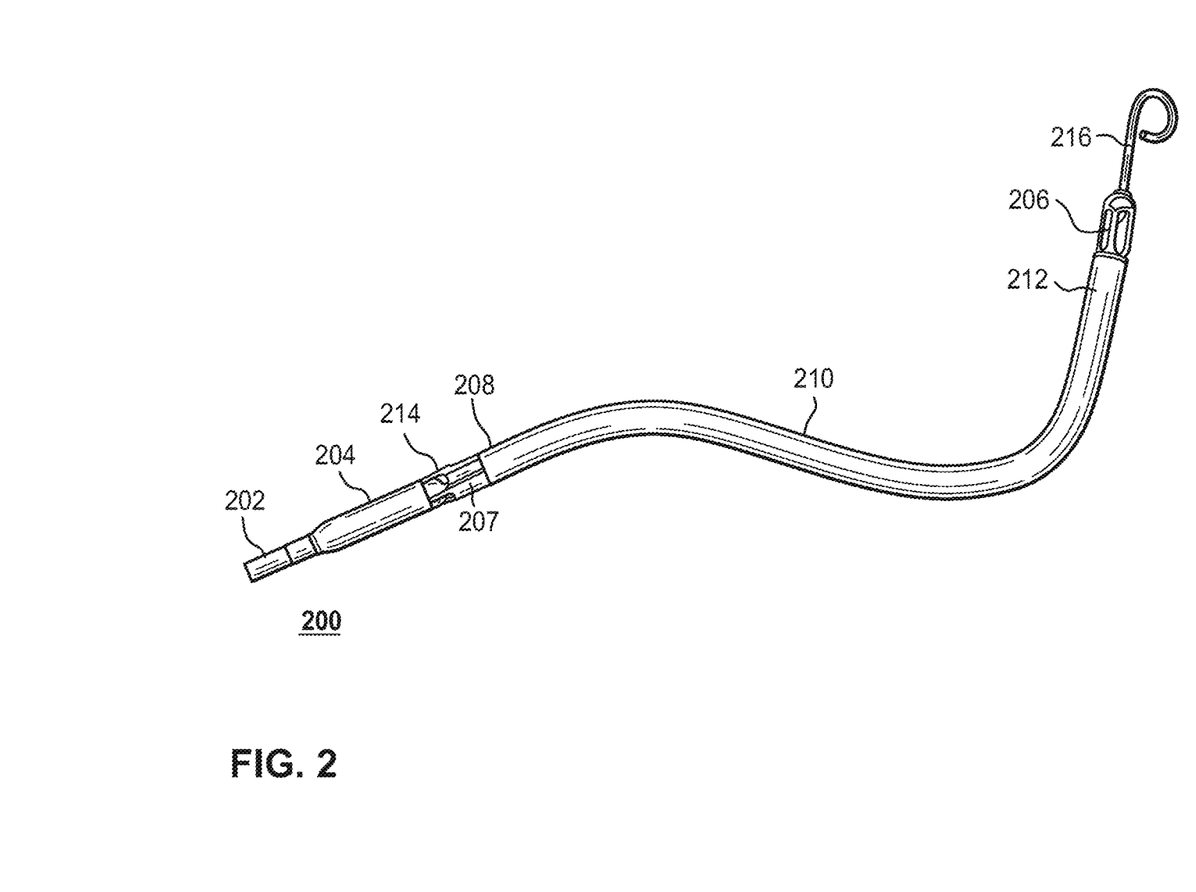
FIG. 2 depicts a conventional intravascular blood pump configured for right heart support.

FIG. 2 depicts a conventional intravascular blood pump 200 adapted for right heart support. In that regard, the exemplary conventional intravascular blood pump 200 includes an elongate catheter 202, a motor 204, a cannula 210, a blood inflow cage 214 arranged at or near the proximal end 208 of the cannula 210, a blood outflow cage 206 arranged at or near the distal end 212 of the cannula 210, and an optional atraumatic extension 216 arranged at the distal end of the blood outflow cage 206. As with the exemplary assembly of FIG. 1, motor 204 is configured to rotatably drive an impeller (not shown) within the pump housing 207, thereby generating suction sufficient to draw blood into cannula 210 through the blood inflow cage 214, and to expel the blood out of cannula 210 through the blood outflow cage 206. Here as well, in this conventional intravascular blood pump 200, the motor 204 is directly and rigidly connected to the pump housing 207.

Figure 3:
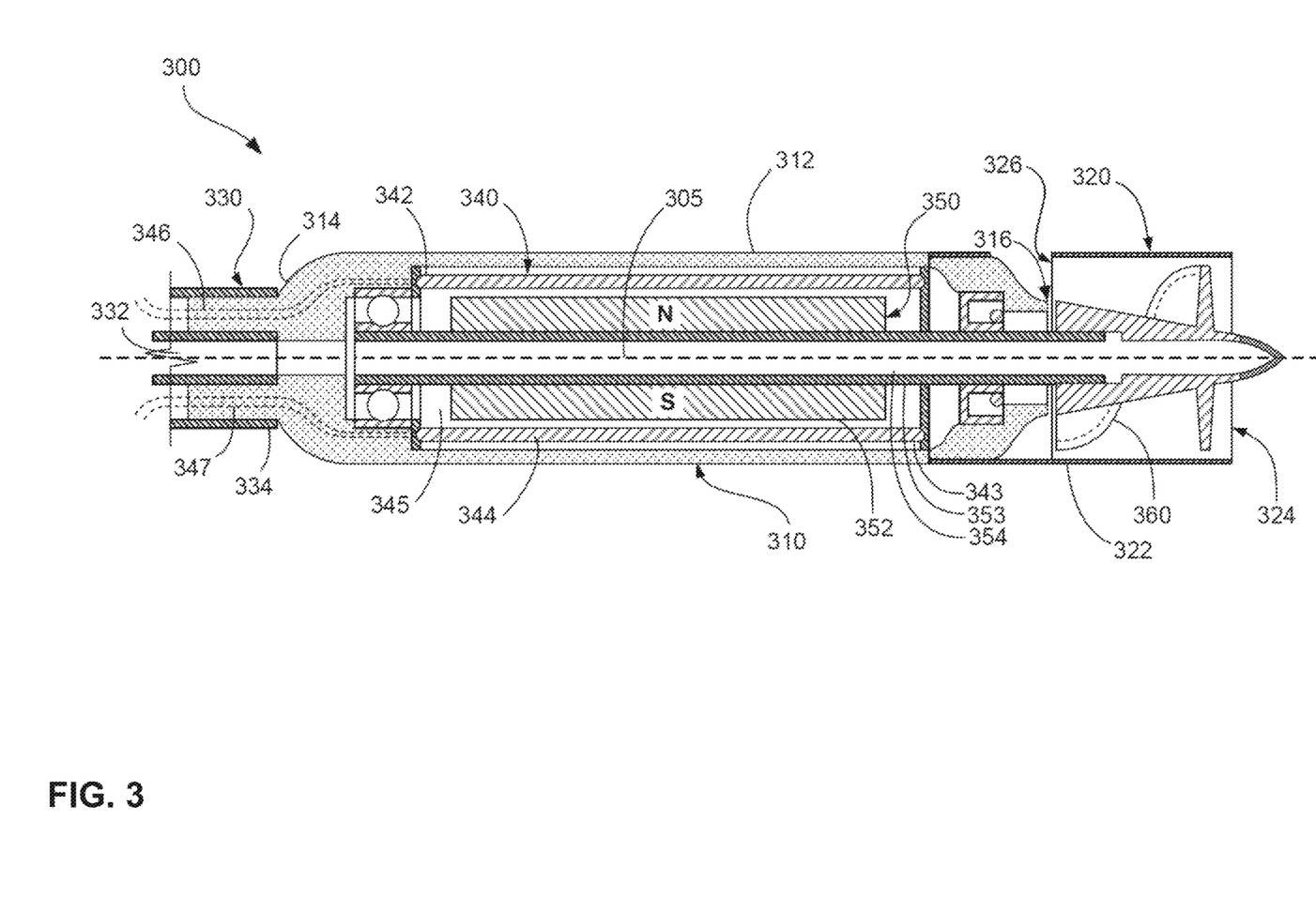
FIG. 3 depicts a cross-sectional view of an exemplary motor and drive assembly configured for use with the conventional intravascular blood pump assemblies of FIGS. 1 and 2.

FIG. 3 depicts a cross-sectional view of an exemplary motor and drive assembly 300 configured for use with the conventional intravascular blood pump assemblies of FIGS. 1 and 2. However, while in this example the motor unit 310 is rigidly connected to the pump unit 320 and configured to drive the impeller 360 via a single drive shaft 353, the same types of motor units and pump units may be employed in the examples of FIGS. 4-7 discussed below, in which the motor units and pump units are connected via flexible intermediate sections. As such, the details described below with respect to motor unit 310, pump unit 320, and catheter 330 below also apply to the examples of FIGS. 4-7.

In that regard, in FIG. 3, motor and drive assembly 300 comprises a motor unit 310 and a pump unit 320 arranged along a longitudinal axis 305. The motor unit 310 comprises an electric motor including a stator winding 340 and a rotor 350 contained within a motor housing 312. In this example, the stator winding 340 extends from a proximal end 342 to a distal end 343, and comprises wires 344 wound in a particular pattern. In that regard, wires 344 may be wound in any suitable pattern, any suitable dimensions, and with any suitable number of turns. For example, in some aspects of the technology, wires 344 may have a diameter of 0.07 mm, and may be wound in a 2-layer pattern with 30 turns, an inner diameter of 2.66 mm, an outer diameter of 3.01 mm.

The stator winding 340 defines a central lumen 345 in which the rotor 350 is positioned. In this example, the stator winding 340 is slotless such that the wires 344 are wound upon themselves and not onto a conventional laminated stator core. Feed lines 346 and 347 provide the necessary electrical connections between a power supply, which may be external, and the stator winding 340 for operation of the motor unit 310. Each of the wires 344 may have an insulating coating (not shown). Likewise, in some cases, the wound stator wires 344 may be encapsulated or over-molded by a synthetic epoxide resin (also not shown).

In the example of FIG. 3, the stator winding 340 and the motor housing 312 are depicted as separate components. However, in some cases, the stator winding 340 may be encapsulated within the motor housing 312 to form a single component. Further, in some aspects of the technology, the motor housing 312 may also be manufactured from a magnetically conductive material such as iron-chromium-aluminum alloys (e.g., KANTHAL), cobalt-iron alloys (e.g., VACOFLUX, VACODUR), etc. The motor housing 312 comprises a proximal end 314 and a distal end 316. In this example, the proximal end 314 of the motor housing 312 is coupled to a distal end 334 of a catheter 330 which may comprise a flexible tube with a lumen 332 which extends towards the physician for control and operation of the motor and drive assembly 300.

In the example of FIG. 3, the rotor 350 comprises a permanent magnet 352 that is rotationally supported about a shaft 353 within the lumen 345 of the stator 340. Magnet 352 may comprise a cylindrical permanent magnet that surrounds the shaft 353 within the motor unit 310. In this example, the motor housing 312 is rigidly connected to the pump housing 322, and shaft 353 extends from the motor unit 310 directly into the pump unit 320 to facilitate rotation of an impeller 360 for the pumping of blood. In this example, the shaft 353 is hollow and thus comprises a lumen 354. In some cases, the rotor 350 may comprise several permanent magnets radially arranged about the shaft 353, or an electromagnetic magnet having its own rotor windings. For example, and as shown in FIG. 3, for a motor having one pole pair, the magnet 352 may comprise one north pole N and one south pole S. However, in some cases, a motor may be configured to have two pole pairs, in which case the magnet 352 may comprise two north poles N1 and N2, and two south poles, S1 and S2, arranged alternately around the shaft 353.

Further, while FIG. 3 illustrates the rotor 350 as rotatable within the stator 340, the electric motor of the motor unit 310 may alternatively be configured such that the stator 340 is held stationary about the shaft 353 and the rotor 350 is configured as a cylinder that rotates around the stator 340.

Interaction between the stator 340 and rotor 350 of the motor unit 310 generates torque in the rotor 350 causing the shaft 353 to rotate, which, in turn, causes the impeller 360 to rotate in the pump housing 322. When this occurs, blood may be pumped from a distal opening 324 to one or more proximal openings 326, or from the one or more proximal openings 326 to distal opening 324. For example, the one or more proximal openings 326 may correspond to the orifices of a blood outflow cage of an intravascular blood pump adapted for left-heart support (e.g., blood outflow cage 106 or 506 of FIGS. 1 and 5, respectively) or the blood inflow cage of an intravascular blood pump adapted for right heart support (e.g., blood inflow cage 214 and 614 of FIGS. 2 and 6, respectively). Likewise, distal opening 324 may be configured to attach to a proximal end of a cannula, such that the impeller pulls blood from a blood inflow cage at the opposing end of the cannula (e.g., as shown and described with respect to FIGS. 1 and 5), or pumps blood to a blood outflow cage at the opposing end of the cannula (e.g., as shown and described with respect to FIGS. 2 and 6).

Figure 4:
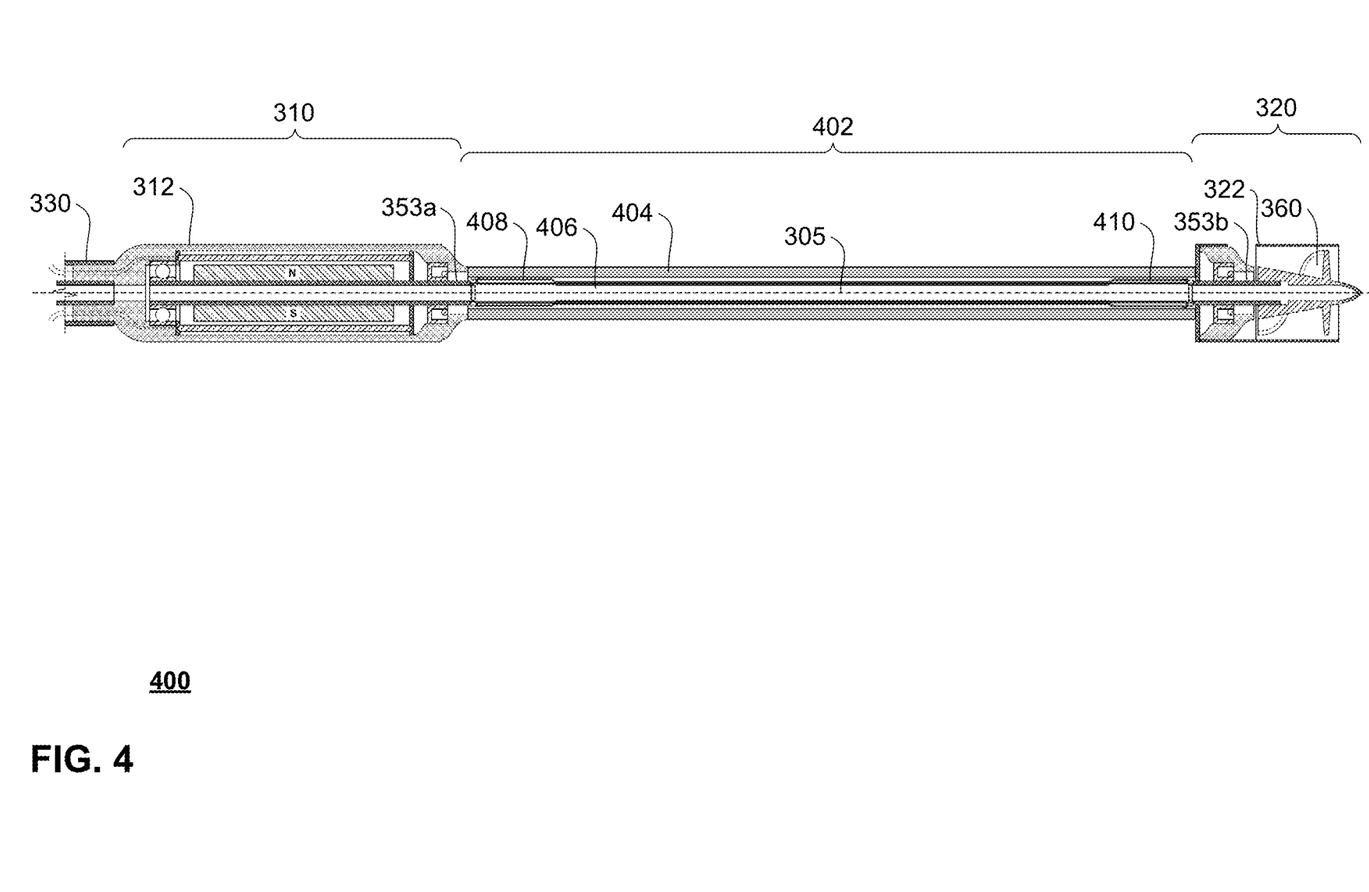
FIG. 4 depicts a cross-sectional view of an exemplary motor and drive assembly employing a flexible intermediate section, in accordance with aspects of the disclosure.

FIG. 4 depicts a cross-sectional view of an exemplary motor and drive assembly 400 employing a flexible intermediate section 402, in accordance with aspects of the disclosure. In that regard, in FIG. 4, motor and drive assembly 400 comprises the catheter 330, motor unit 310, and pump unit 320 of FIG. 3, with the motor unit 310 and pump unit 320 separated by a flexible intermediate section 402. As motor unit 310 and pump unit 320 have been physically separated, the shaft 353 has been separated into two sections: a motor shaft 353a and an impeller shaft 353b. Each of these components are arranged along a common longitudinal axis 305.

In the example of FIG. 4, the flexible intermediate section 402 comprises a flexible drive shaft 406 arranged within a sheath 404. The proximal end of the flexible drive shaft 406 is coupled to the motor shaft 353a by a proximal coupling 408, and the distal end of the flexible drive shaft 406 is coupled to the impeller shaft 353b by a distal coupling 410. These proximal and distal couplings 408 and 410 may be effectuated in any suitable way. For example, the flexible drive shaft 406 may be coupled to the motor shaft 353a and/or the impeller shaft 353b using crimping, welding, adhesives, combinations thereof, etc. Likewise, in some cases, the flexible drive shaft 406 may be removably coupled to the motor shaft 353a and/or the impeller shaft 353b using threaded connections, pinned connections, bayonet connections, etc.

Likewise, any suitable type of shaft may be used for flexible drive shaft 406. For example, the flexible drive shaft 406 may comprise a solid or hollow shaft made of a flexible metal, polymer, or composite material. In other examples, the flexible drive shaft 406 may be a flexible cable comprised of wound and/or woven strands (e.g., metal threads, polymer threads, combinations thereof), or of multiple overlapping layers of wound and/or woven strands. Further, in cases where the flexible drive shaft 406 is comprised of one or more layers of wound and/or woven strands (e.g., metal threads, polymer threads, combinations thereof), the one or more layers of wound and/or woven strands may be wound overtop of a solid or hollow shaft made of a flexible metal, polymer, or composite material.

Further, any suitable type of sheath 404 may be employed. In that regard, the sheath 404 may be configured to provide a desired amount of flexibility to the flexible intermediate section 402, while maintaining sufficient strength to resist bending forces imposed upon it by the flexible drive shaft 406 as it rotates. In some aspects of the technology, the sheath 404 may be composed of multiple layers. For example, the sheath 404 may comprise an inner layer configured to reduce friction and wear between the sheath 404 with the spinning flexible drive shaft 406, and an outer layer configured to minimize trauma when contacting the patient's vasculature and prevent bodily fluids from reaching the inside of the sheath 404. In this regard, in some aspects of the technology, the sheath 404 may be configured to seal against and/or overlap a portion of the motor housing 312 and/or the pump housing 322. Further, in some aspects of the technology, the flexible intermediate section 402 may also include one or more structures configured to minimize or prevent direct contact between the sheath 404 and the flexible drive shaft 406 (e.g., a helical wire bearing wound around the flexible drive shaft 406).

Likewise, while the example of FIG. 4 includes a rigid motor shaft 353a and a rigid impeller shaft 353b, in some aspects of the technology, one or both of these structures may be replaced with a flexible drive shaft. For example, in some aspects of the technology, a rigid motor shaft 353a may be coupled to a flexible drive shaft 406 that extends into the motor unit 310 and couples directly to the impeller 360. Further, in some aspects of the technology, a single flexible drive shaft 406 may extend all the way from the motor unit 310, through the flexible intermediate section 402, and into the pump unit 320, with no need for any couplings 408 or 410. Further, in some aspects of the technology, a single flexible drive shaft 406 with sections of differing stiffness may extend from the motor unit 310, through the flexible intermediate section 402, and into the pump unit 320. For example, a flexible drive shaft 406 may be configured to include relatively stiff sections within motor unit 310 and/or pump unit 320, and to be relatively flexible within the flexible intermediate section 402. In this regard, the relatively stiff sections may be ones where a flexible cable has been reinforced with a stiffer core, stiffer outer tube, a coating of sufficient strength, etc.

As explained above, separating the motor housing from the pump housing as shown in FIG. 4 (and FIGS. 5-8, as discussed below) allows the motor housing to be made longer and narrower while still allowing the intravascular pump to be flexible enough to navigate tight bends within a patient's vasculature. Likewise, in such examples, the pump housing may also be reduced in size to match the outer diameter of the motor housing, leading to a smaller overall profile of the motor and drive assembly. In that regard, any suitable dimensions for the motor housing 310, flexible intermediate section 402, and pump housing 322 may be used. For example, in some aspects of the technology, the motor housing 312 and pump housing 322 may have a maximum external diameter of 10 Fr (3.33 mm), and the motor housing 312 may have a total length of 14-16 mm. Likewise, in some aspects of the technology, the motor housing 312 may have a maximum external diameter that is between about 0.20 and about 0.24 of the total length of the motor housing 312. Moreover, by making the motor unit 310 longer and thinner, the motor housing 312 has more surface area through which to dissipate heat, and can generate a higher flowrate than a pump driven by a motor unit of similar design that is nevertheless shorter and thicker (e.g., one using a motor with a maximum outer diameter of 12 Fr (4 mm), and a total length of 12 mm).

Thus, in order to minimize the combined length of the motor housing and pump housing in pumps where the two are rigidly connected, designers may be forced to reduce one or both of those housings to sizes that are otherwise not ideal for providing required motor performance and/or cooling characteristics. In contrast, separating the motor housing from the pump housing allows both to be optimized for their various functions while each section remains short enough to allow the pump to negotiate tight areas of a patient's anatomy. For example, the present technology may enable the motor (and its housing) to be made narrower and longer while retaining or exceeding the same power output, thus allowing the overall diameter of the intravascular blood pump to be reduced. Likewise, although there are intravascular blood pumps which employ external motors located outside the patient's body, such designs require long drive shafts that may incur substantial driveline losses (e.g., as much as 50%). In contrast, by using an internal motor connected to the pump housing, a relatively short drive shaft may be used which incurs far lower losses.

Figure 5:
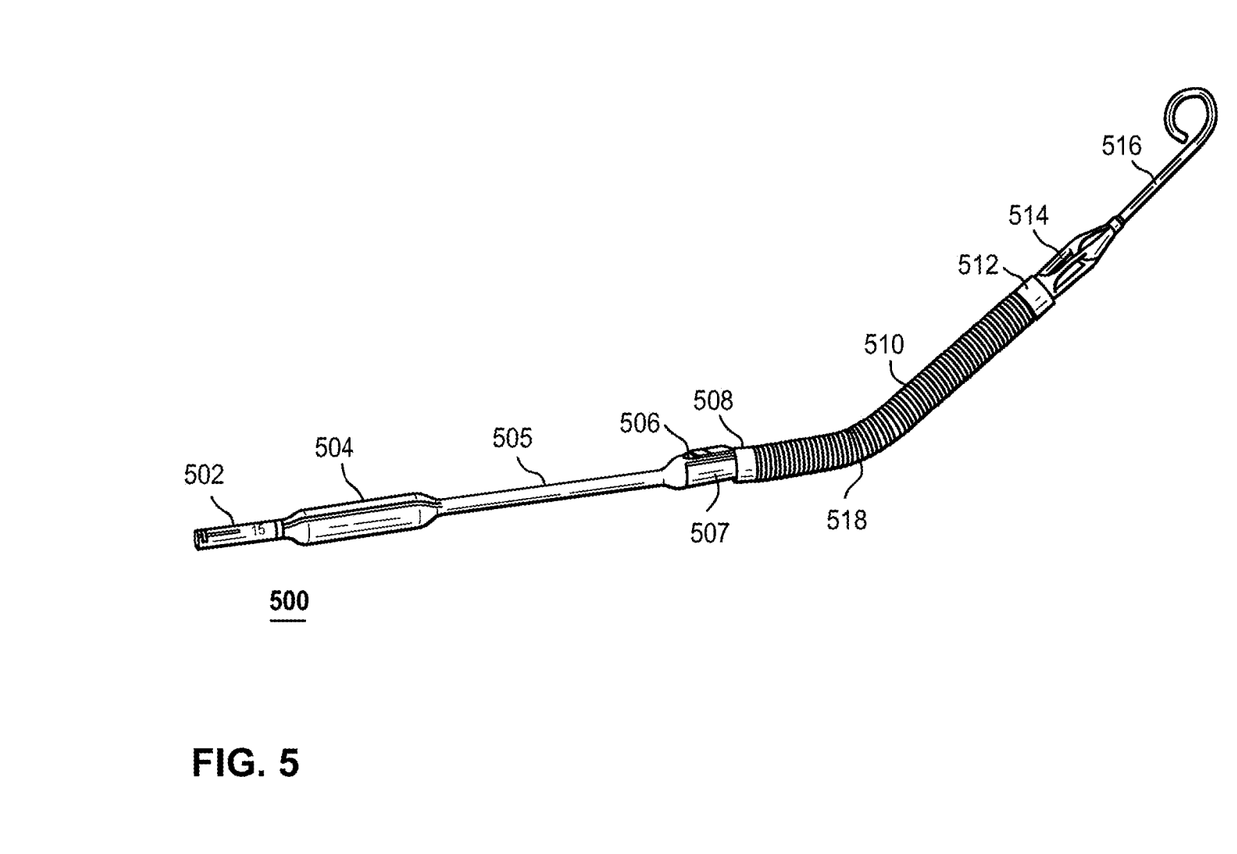
FIG. 5 depicts an exemplary intravascular blood pump configured for left heart support, in accordance with aspects of the disclosure.

FIG. 5 depicts an exemplary intravascular blood pump 500 configured for left heart support, in accordance with aspects of the disclosure. In that regard, the intravascular blood pump 500 includes an elongate catheter 502, a motor 504, a cannula 510, a blood inflow cage 514 arranged at or near the distal end 512 of the cannula 510, a blood outflow cage 506 arranged at or near the proximal end 508 of the cannula 510, and an optional atraumatic extension 516 arranged at the distal end of the blood inflow cage 514.

In the exemplary intravascular blood pump 500, a motor unit is connected to the pump unit via a flexible intermediate section 505. In that regard, motor 504 of the motor unit is configured to rotatably drive an impeller (not shown) via a flexible drive shaft (not shown) housed within the flexible intermediate section 505, thereby generating suction sufficient to draw blood into cannula 510 through the blood inflow cage 514, and to expel the blood out of cannula 510 through the blood outflow cage 506. The impeller may be positioned within the pump housing 507 or a suitable point distal thereof (e.g., within the proximal end 508 of the cannula 510).

Catheter 502 may house electrical lines coupling the motor 504 to one or more electrical controllers, power supplies, sensors, etc. Catheter 502 may also include a purge fluid conduit, a lumen configured to receive a guidewire, etc.

The blood inflow cage 514 includes one or more apertures or openings configured to allow blood to be drawn into cannula 510 when the motor 504 is operating. Likewise, blood outflow cage 506 includes one or more apertures or openings configured to allow blood to flow from the cannula 510 out of the intravascular blood pump 500. Blood inflow cage 514 and outflow cage 506 may be composed of any suitable bio-compatible material(s). For example, blood inflow cage 514 and/or blood outflow cage 506 may be formed out of bio-compatible metals such as stainless steel, titanium, or biocompatible polymers such as polyurethane. In addition, the surfaces of blood inflow cage 514 and/or blood outflow cage 506 may be treated in various ways, including, but not limited to etching, texturing, or coating or plating with another material. For example, the surfaces of blood inflow cage 514 and/or blood outflow cage 506 may be laser textured.

Cannula 510 may include a flexible hose portion. For example, cannula 510 may be composed, at least in part, of a polyurethane material. In addition, cannula 510 may include a shape-memory material. For example, cannula 510 may comprise a combination of a polyurethane material and one or more strands or coils of a shape-memory material such as Nitinol. Cannula 510 may be formed such that it includes one or more bends or curves in its relaxed state, or it may be configured to be straight in its relaxed state. In that regard, in the exemplary arrangement shown in FIG. 5, the cannula 510 has a single pre-formed anatomical bend 518 based on the portion of the left heart in which it is intended to operate. Despite this bend 518, the cannula 510 may nevertheless also be flexible, and may thus be capable of straightening (e.g., during insertion over a guidewire), or bending further (e.g., in a patient whose anatomy has tighter dimensions). Further in that regard, cannula 510 may include a shape-memory material configured to allow the cannula 510 to be a different shape (e.g., straight or mostly straight) at room temperatures, and to form bend 518 once the shape-memory material is exposed to the heat of a patient's body.

Atraumatic extension 516 assists with stabilizing and positioning the intravascular blood pump 500 in the correct position in the patient's heart. Atraumatic extension 516 may be solid or tubular. If tubular, atraumatic extension 516 may be configured to allow a guidewire to be passed through it to further assist in the positioning of the intravascular blood pump 500. Atraumatic extension 516 may be any suitable size. For example, atraumatic extension 516 may have an outer diameter in the range of 4-8 Fr. Atraumatic extension 516 may be composed, at least in part, of a flexible material, and may be any suitable shape or configuration such as a straight configuration, a partially curved configuration, a pigtail-shaped configuration as shown in the example of FIG. 5, etc. Atraumatic extension 516 may also have sections with different stiffnesses. For example, atraumatic extension 516 may include a proximal section that is stiff enough to prevent it from buckling, thereby keeping the blood inflow cage 514 in the desired location, and a distal section that is softer and has a lower stiffness, thereby providing an atraumatic tip for contact with a wall of the patient's heart and to allow for guidewire loading. In such a case, the proximal and distal sections of the atraumatic extension 516 may be composed of different materials, or may be composed of the same material, treated to provide different stiffnesses.

Notwithstanding the foregoing, as mentioned above, atraumatic extension 516 is an optional structure. In that regard, the present technology may also be used with intravascular blood pump assemblies and other intravascular blood pumps that include extensions of different types, shapes, materials, and qualities. Likewise, the present technology may be used with intravascular blood pump assemblies and other intravascular blood pumps that have no distal extensions of any kind.

Intravascular blood pump 500 may be inserted percutaneously. For example, when used for left heart support, intravascular blood pump 500 may be inserted via a catheterization procedure through the femoral artery or axillary artery, into the aorta, across the aortic valve, and into the left ventricle. Once positioned in this way, the intravascular blood pump 500 delivers blood from the blood inflow cage 514, which sits inside the left ventricle, through cannula 510, to the blood outflow cage 506, which sits inside the ascending aorta. In some aspects of the technology, intravascular blood pump 500 may be configured such that bend 518 will rest against a predetermined portion of the patient's heart when the intravascular blood pump 500 is in a desired location. Likewise, the atraumatic extension 516 may be configured such that it rests against a different predetermined portion of the patient's heart when the intravascular blood pump 500 is in the desired location.

Figure 6:
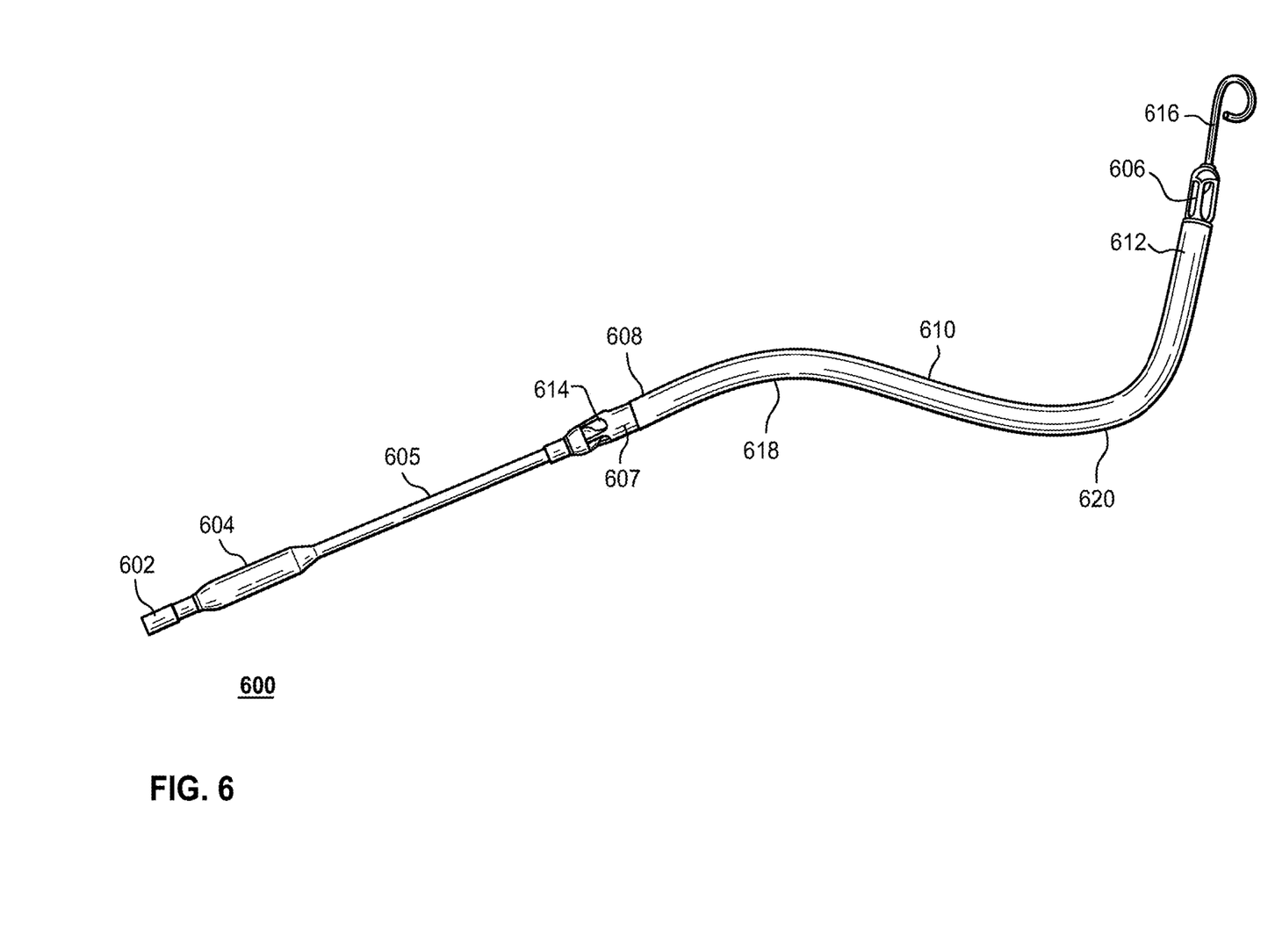
FIG. 6 depicts an exemplary intravascular blood pump configured for right heart support, in accordance with aspects of the disclosure.

FIG. 6 depicts an exemplary intravascular blood pump 600 adapted for right heart support, in accordance with aspects of the disclosure. In that regard, the intravascular blood pump 600 includes an elongate catheter 602, a motor 604, a cannula 610, a blood inflow cage 614 arranged at or near the proximal end 608 of the cannula 610, a blood outflow cage 606 arranged at or near the distal end 612 of the cannula 610, and an optional atraumatic extension 616 arranged at the distal end of the blood outflow cage 606.

As with the exemplary assembly of FIG. 5, a motor unit is connected to the pump unit via a flexible intermediate section 605. In that regard, motor 604 of the motor unit is configured to rotatably drive an impeller (not shown) via a flexible drive shaft (not shown) housed within the flexible intermediate section 605, thereby generating suction sufficient to draw blood into cannula 610 through the blood inflow cage 614, and to expel the blood out of cannula 610 through the blood outflow cage 606. The impeller may be positioned within the pump housing 607 or a suitable point distal thereof (e.g., within the proximal end 608 of the cannula 510).

The cannula 610 of FIG. 6 serves the same purpose, and may have the same properties and features described above with respect to cannula 510 of FIG. 5. However, in the exemplary arrangement shown in FIG. 6, the cannula 610 has two pre-formed anatomical bends 618 and 620 based on the portion of the right heart in which it is intended to operate. Here again, despite the existence of bends 618 and 620, the cannula 610 may nevertheless also be flexible, and may thus be capable of straightening (e.g., during insertion over a guidewire), or bending further (e.g., in a patient whose anatomy has tighter dimensions). Further in that regard, cannula 610 may include a shape-memory material configured to allow the cannula 610 to be a different shape (e.g., straight or mostly straight) at room temperatures, and to form bends 618 and/or 620 once the shape-memory material is exposed to the heat of a patient's body.

The catheter 602 and atraumatic extension 616 of FIG. 6 serve the same purpose and may have the same properties and features described above with respect to catheter 502 and atraumatic extension 516 of FIG. 5. Likewise, other than being located at opposite ends of the cannula from those of FIG. 5, the blood inflow cage 614 and blood outflow cage 606 of FIG. 6 are similar to the blood inflow cage 514 and blood outflow cage 506 of FIG. 5, and thus may have the same properties and features described above.

Like the exemplary assembly of FIG. 5, the intravascular blood pump 600 of FIG. 6 may also be inserted percutaneously. For example, when used for right heart support, intravascular blood pump 600 may be inserted via a catheterization procedure through the femoral vein, into the inferior vena cava, through the right atrium, across the tricuspid valve, into the right ventricle, through the pulmonary valve, and into the pulmonary artery. Once positioned in this way, the intravascular blood pump 600 delivers blood from the blood inflow cage 614, which sits inside the inferior vena cava, through cannula 610, to the blood outflow cage 606, which sits inside the pulmonary artery.

Figure 7:
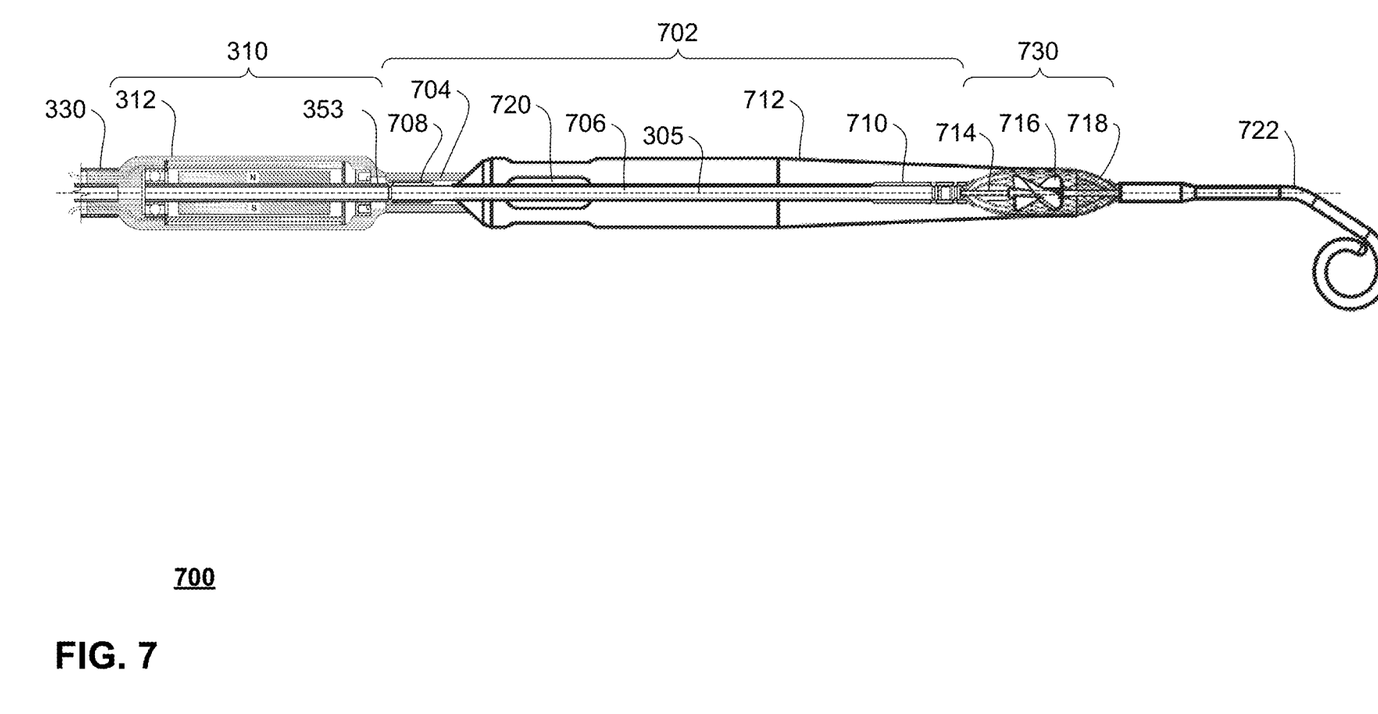
FIG. 7 depicts a cross-sectional view of an exemplary motor and drive assembly employing a flexible intermediate section and a compressible pump unit, in accordance with aspects of the disclosure.

FIG. 7 depicts a cross-sectional view of an exemplary motor and drive assembly 700 of an intravascular blood pump, in which the motor and drive assembly 700 employs a flexible intermediate section 702 and a compressible pump unit 730, in accordance with aspects of the disclosure. In that regard, in FIG. 7, motor and drive assembly 700 comprises the catheter 330 and motor unit 310 of FIG. 3 and a compressible pump unit 730, with the motor unit 310 and pump unit 730 separated by a flexible intermediate section 702. As shown in the exemplary illustration of FIG. 7, each of these components are arranged along a common longitudinal axis 305. However, as will be understood, the flexible intermediate section 702 will also allow the motor unit 310 and compressible pump unit 730 to be arranged at angles to one another, e.g., as may be the case when they are navigating through bends in a patient's vasculature. At the distal end of the motor and drive assembly 700, the exemplary intravascular blood pump of FIG. 7 further comprises an optional atraumatic extension 722 similar to those described above with respect to FIGS. 1, 2, 5, and 6.

In the example of FIG. 7, the flexible intermediate section 702 comprises a flexible drive shaft 706 that extends through both a sheath 704 and a portion of a compressible cannula 712. In this way, the compressible cannula 712 may form a part of the flexible intermediate section 702. As in the example of FIG. 4, the proximal end of the flexible drive shaft 706 is coupled to the motor shaft 353 by a proximal coupling 708, and the distal end of the flexible drive shaft 706 is coupled to an impeller shaft 714 by a distal coupling 710. Here as well, these proximal and distal couplings 708 and 710 may be effectuated in any suitable way. For example, the flexible drive shaft 706 may be coupled to the motor shaft 353 and/or the impeller shaft 714 using crimping, welding, adhesives, combinations thereof, etc. Likewise, in some cases, the flexible drive shaft 706 may be removably coupled to the motor shaft 353 and/or the impeller shaft 714 using threaded connections, pinned connections, bayonet connections, etc.

Likewise, here as well, any suitable type of shaft may be used for flexible drive shaft 706. For example, the flexible drive shaft 706 may comprise a solid or hollow shaft made of a flexible metal, polymer, or composite material. In other examples, the flexible drive shaft 706 may be a flexible cable comprised of wound and/or woven strands (e.g., metal threads, polymer threads, combinations thereof), or of multiple overlapping layers of wound and/or woven strands. Further, in cases where the flexible drive shaft 706 is comprised of one or more layers of wound and/or woven strands (e.g., metal threads, polymer threads, combinations thereof), the one or more layers of wound and/or woven strands may be wound overtop of a solid or hollow shaft made of a flexible metal, polymer, or composite material.

Further, any suitable type of sheath 704 may be employed. In that regard, the sheath 704 may be configured to provide a desired amount of flexibility to the flexible intermediate section 702, while maintaining sufficient strength to resist bending forces imposed upon it by the flexible drive shaft 706 as it rotates. In some aspects of the technology, the sheath 704 may be composed of multiple layers. For example, the sheath 704 may comprise an inner layer configured to reduce friction and wear between the sheath 704 with the spinning flexible drive shaft 706, and an outer layer configured to minimize trauma when contacting the patient's vasculature and prevent bodily fluids from reaching the inside of the sheath 704. In this regard, in some aspects of the technology, the sheath 704 may be configured to seal against and/or overlap a portion of the motor housing 312 and/or the compressible cannula 712. Further, although sheath 704 is shown in FIG. 7 as stopping where the compressible cannula 712 begins, the sheath 704 may also be configured to extend into the compressible cannula 712. For example, the sheath 704 may extend along the entire length of the flexible drive shaft 706 to prevent the spinning shaft from damaging blood flowing within the compressible cannula 712. Likewise, in some aspects of the technology, the sheath 704 may extend only part of the way into the compressible cannula 712. Here as well, in some aspects of the technology, the flexible intermediate section 702 may further include one or more structures configured to minimize or prevent direct contact between the sheath 704 and the flexible drive shaft 706 (e.g., a helical wire wound around the flexible drive shaft 706).

Likewise, while the example of FIG. 7 includes a rigid motor shaft 353 and a rigid impeller shaft 714, in some aspects of the technology, one or both of these structures may be replaced with a flexible drive shaft. For example, in some aspects of the technology, a rigid motor shaft 353 may be coupled to a flexible drive shaft 706 that extends into compressible pump unit 730 and couples directly to the impeller 716. Further, in some aspects of the technology, a single flexible drive shaft 706 may extend all the way from the motor unit 310, through the flexible intermediate section 702, and to impeller 716, with no need for any couplings 708 or 710. Further, in some aspects of the technology, a single drive shaft 706 with sections of differing stiffness may extend from the motor unit 310, through the flexible intermediate section 702, and to impeller 716. For example, a drive shaft 706 may be configured to include relatively stiff sections within motor unit 310 and/or where it connects to impeller 716, and to be relatively flexible within the flexible intermediate section 702. In this regard, the relatively stiff sections may be ones where a flexible cable has been reinforced with a stiffer core, stiffer outer tube, a coating of sufficient strength, etc.

Further, the compressible pump unit 730 may be made compressible in any suitable way. For example, the impeller 716 may comprise a foam or other compressible material, may be made inflatable, and/or may be configured with blades that can be folded back or retracted so as to allow the impeller 716 to be compressed. Likewise, the impeller 716 may be surrounded by a compressible cage 718 (which may serve as a blood inflow cage or blood outflow cage depending on pumping direction) constructed of a flexible metal (e.g., Nitinol), polymer, or composite material.

Likewise, the compressible cannula 712 may comprise a flexible polymer or elastomer allowing it to be compressed. In some aspects of the technology, compressible cannula 712 may comprise a material configured to remain compressed until the pump unit 730 is in operation, at which point the flow of blood created by the impeller 716 expands the compressible cannula 712. In some aspects of the technology, the compressible cannula 712 may comprise sections constructed of a compressible and/or flexible polymer or elastomer, and other sections that are configured to expand when the pump unit 730 is in operation. For example, the compressible cannula 712 may comprise a flexible polymer or elastomer in and around the proximal cage 720 (which may serve as a blood inflow cage or blood outflow cage depending on pumping direction), and may include a distal section that is configured to expand when the pump unit 730 is in operation. In addition, in some aspects of the technology, motor and drive assembly 700 may further comprise a compression sleeve or secondary catheter (not shown) configured to maintain the compressible cannula 712 in a compressed state until the motor and drive assembly 700 has been delivered to a desired location within a patient. Once at the desired location, the motor and drive assembly 700 may then be advanced out of the distal end of the compression sleeve or secondary catheter thus allowing the compressible pump unit 730 and compressible cannula 712 to expand (passively, or as a result of the pump unit 730 being operated).

Figure 8:
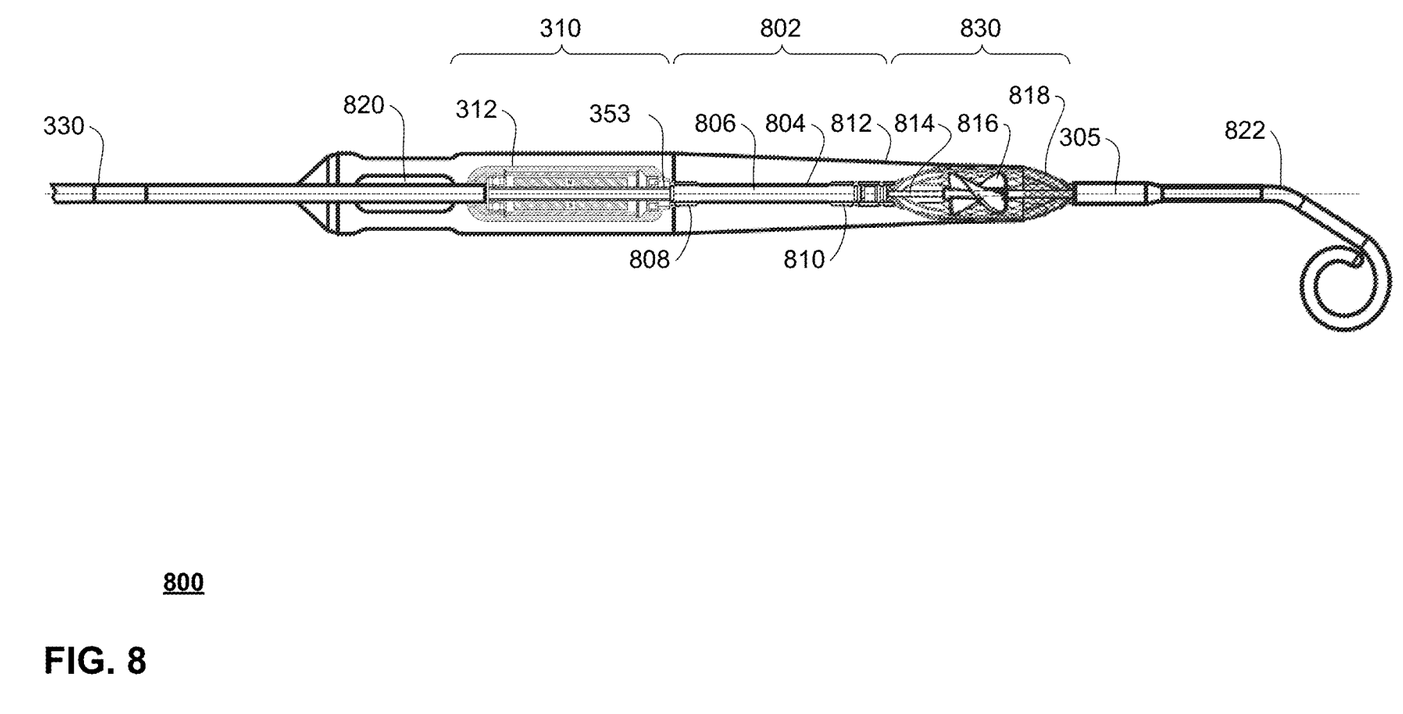
FIG. 8 depicts a cross-sectional view of an exemplary motor and drive assembly employing a flexible intermediate section and a compressible pump unit, in accordance with aspects of the disclosure.

FIG. 8 depicts a cross-sectional view of an exemplary motor and drive assembly 800 of an intravascular blood pump, in which the motor and drive assembly 800 employs a flexible intermediate section 802 and a compressible pump unit 830, in accordance with aspects of the disclosure. In that regard, in FIG. 8, motor and drive assembly 800 comprises the catheter 330 and motor unit 310 of FIG. 3, and a compressible pump unit 830 similar to that of FIG. 7. However, in FIG. 8, the motor unit 310 is arranged within the compressible cannula 812, with a flexible intermediate section 802 being inside the compressible cannula 812 between the motor unit 310 and the compressible pump unit 830. Like FIG. 7, FIG. 8 depicts the catheter 330, the motor unit 310, and the compressible pump unit 830 being arranged along a common longitudinal axis 305. However, as will be understood, the flexible intermediate section 802 will also allow the motor unit 310 to bend within the compressible pump unit 830 such that the motor unit 310 may be arranged at an angle to the compressible pump unit 830, e.g., as may be the case when they are navigating through bends in a patient's vasculature. At the distal end of the motor and drive assembly 800, the exemplary intravascular blood pump of FIG. 8 further comprises an optional atraumatic extension 822 similar to those described above with respect to FIGS. 1, 2, and 5-7.

In the example of FIG. 8, the flexible intermediate section 802 comprises a flexible drive shaft 806 that extends through a sheath 804, which itself is housed within a compressible cannula 812. In this way, the compressible cannula 812 may form a part of the flexible intermediate section 802. As in the example of FIG. 4, the proximal end of the flexible drive shaft 806 is coupled to the motor shaft 353 by a proximal coupling 808, and the distal end of the flexible drive shaft 806 is coupled to an impeller shaft 814 by a distal coupling 810. In FIG. 8 as well, the proximal and distal couplings 808 and 810 may be effectuated in any suitable way as discussed above with respect to FIG. 7. Likewise, here as well, any suitable type of shaft may be used for flexible drive shaft 806, as discussed above with respect to FIG. 7.

In FIG. 8 as well, any suitable type of sheath 804 may be employed. In that regard, the sheath 804 may be configured to provide a desired amount of flexibility to the flexible intermediate section 802, while maintaining sufficient strength to resist bending forces imposed upon it by the flexible drive shaft 806 as it rotates. In some aspects of the technology, the sheath 804 may be composed of multiple layers. For example, the sheath 804 may comprise an inner layer configured to reduce friction and wear between the sheath 804 with the spinning flexible drive shaft 806, and an outer layer configured to minimize trauma when contacting the patient's vasculature and prevent bodily fluids from reaching the inside of the sheath 804. In this regard, in some aspects of the technology, the sheath 804 may be configured to seal against and/or overlap a portion of the motor housing 312. Here as well, in some aspects of the technology, the flexible intermediate section 802 may further include one or more structures configured to minimize or prevent direct contact between the sheath 804 and the flexible drive shaft 806 (e.g., a helical wire wound around the flexible drive shaft 806).

Likewise, while the example of FIG. 8 includes a rigid motor shaft 353 and a rigid impeller shaft 814, in some aspects of the technology, one or both of these structures may be replaced with a flexible drive shaft. For example, in some aspects of the technology, the flexible drive shaft 806 may couple directly to the impeller 816. Further, in some aspects of the technology, a single flexible drive shaft 806 may extend all the way from the motor unit 310, through the flexible intermediate section 802, and to impeller 816, with no need for any couplings 808 or 810. Further, in some aspects of the technology, a single drive shaft 806 with sections of differing stiffness may extend from the motor unit 310, through the flexible intermediate section 802, and to impeller 816. For example, a drive shaft 806 may be configured to include relatively stiff sections within motor unit 310 and/or where it connects to impeller 816, and to be relatively flexible within the flexible intermediate section 802. In this regard, the relatively stiff sections may be ones where a flexible cable has been reinforced with a stiffer core, stiffer outer tube, a coating of sufficient strength, etc.

In FIG. 8 as well, the compressible pump unit 830 may be made compressible in any suitable way. For example, the impeller 816 may comprise a foam or other compressible material, may be made inflatable, and/or may be configured with blades that can be folded back or retracted so as to allow the impeller 816 to be compressed. Likewise, the impeller 816 may be surrounded by a compressible cage 818 (which may serve as a blood inflow cage or blood outflow cage depending on pumping direction) constructed of a flexible metal (e.g., Nitinol), polymer, or composite material.

Likewise, the compressible cannula 812 may comprise a flexible polymer or elastomer allowing it to be compressed. In some aspects of the technology, compressible cannula 812 may comprise a material configured to remain compressed until the pump unit 830 is in operation, at which point the flow of blood created by the impeller 816 expands the compressible cannula 812. In some aspects of the technology, the compressible cannula 812 may comprise sections constructed of a compressible and/or flexible polymer or elastomer, and other sections that are configured to expand when the pump unit 830 is in operation. For example, the compressible cannula 812 may comprise a flexible polymer or elastomer in and around the proximal cage 820 (which may serve as a blood inflow cage or blood outflow cage depending on pumping direction) and/or the motor unit 310, and may include a distal section that is configured to expand when the pump unit 830 is in operation. In addition, in some aspects of the technology, motor and drive assembly 800 may further comprise a compression sleeve or secondary catheter (not shown) configured to maintain the compressible cannula 812 in a compressed state until the motor and drive assembly 800 has been delivered to a desired location within a patient. Once at the desired location, the motor and drive assembly 800 may then be advanced out of the distal end of the compression sleeve or secondary catheter thus allowing the compressible pump unit 830 and compressible cannula 812 to expand (passively, or as a result of the pump unit 830 being operated).

From the foregoing and with reference to the various figures, those skilled in the art will appreciate that certain modifications can also be made to the present disclosure without departing from the scope of the same. While several aspects of the disclosure have been shown in the figures, it is not intended that the disclosure be limited thereto, as it is intended that the disclosure be as broad in scope as the art will allow and that the specification be read likewise. Therefore, the above description should not be construed as limiting, but merely as exemplifications of particular aspects of the present technology.

Exemplary Implementations

As already described, the systems and methods disclosed herein may be implemented in various ways. In that regard, the foregoing disclosure is intended to include, but not be limited to, the systems, methods, and combinations and subcombinations thereof that are set forth in the following categories of exemplary implementations.

Category A

A1: An intravascular blood pump, comprising:
  a motor unit comprising a motor, the motor unit being configured to be inserted into vasculature of a patient;
  a pump unit comprising an impeller, the impeller being configured to pump blood when driven in rotation within the patient; and
  a flexible intermediate section arranged between the motor unit and the pump unit, the flexible intermediate section comprising a flexible drive shaft,
  wherein the flexible drive shaft is configured to be driven in rotation by the motor, and to thereby drive the impeller in rotation.

A2: The intravascular blood pump of A1, wherein the motor unit comprises a motor housing, the pump unit comprises a pump housing, and the flexible intermediate section connects the motor housing and the pump housing.

A3: The intravascular blood pump of A1, wherein the pump unit is configured to be compressible.

A4: The intravascular blood pump of A1, further comprising a cannula with at least one blood outflow aperture, the cannula being configured to carry blood from the pump unit to the at least one blood outflow aperture when the impeller is driven in rotation within a patient.

A5: The intravascular blood pump of A4, wherein the motor unit and the flexible intermediate section are arranged within the cannula.

A6: The intravascular blood pump of any of A3 to A5, further comprising a compression sleeve or compression catheter configured to maintain at least a portion of the pump unit in a compressed state.

A7: The intravascular blood pump of any of A3 to A6, wherein the cannula is configured to be compressible.

A8: The intravascular blood pump of any of A3 to A7, wherein the impeller is configured to be compressible.

A9: The intravascular blood pump of A8, wherein the impeller is further configured to have a compressed state and a relaxed state, and to expand when it is brought from the compressed state into the relaxed state.

A10: The intravascular blood pump of any of A1 to A9, wherein the flexible intermediate section further comprises a sheath surrounding at least a portion of the flexible drive shaft.

A11: The intravascular blood pump of A10, wherein the sheath comprises multiple layers.

A12: The intravascular blood pump of any of A10 to A11, wherein the flexible intermediate section further comprises a helical wire bearing arranged within the sheath and wound around the flexible drive shaft.

A13: The intravascular blood pump of any of A1 to A12, wherein the motor unit comprises a housing formed at least in part of a magnetically conductive iron-chromium-aluminum alloy.

A14: The intravascular blood pump of any of A1 to A13, wherein the motor unit comprises a housing formed at least in part of a magnetically conductive cobalt-iron alloy.

A15: The intravascular blood pump of any of A1 to A14, wherein the motor unit has a maximum outer diameter of 10 Fr.

A16: The intravascular blood pump of any of A1 to A15, wherein the motor unit has a total length of between 14 and 16 mm.

A17: The intravascular blood pump of any of A1 to A16, wherein the motor unit has a maximum external diameter and a total length, the maximum external diameter of the motor unit being between 0.20 and 0.24 of the total length of the motor unit.

A18: The intravascular blood pump of any of A1 to A17, wherein the intravascular blood pump is an intravascular blood pump configured for use in a left heart.

A19: The intravascular blood pump of any of A1 to A18, wherein the intravascular blood pump is an intravascular blood pump configured for use in a right heart.

Category B

B20: An intravascular blood pump, comprising:
a motor unit comprising a motor, the motor unit being configured to be inserted into vasculature of a patient;
a pump unit comprising an impeller, the impeller being configured to pump blood when driven in rotation within the patient; and
a flexible drive shaft configured to be driven in rotation by the motor, and to thereby drive the impeller in rotation.

B21: The intravascular blood pump of B20, wherein the impeller is configured to have a compressed state and a relaxed state, and to expand when it is brought from the compressed state into the relaxed state.

The invention claimed is:
1. An intravascular blood pump, comprising:
a motor unit comprising a motor housing and a motor arranged within the motor housing, the motor unit being configured to be inserted into vasculature of a patient;
a pump unit comprising a pump housing and an impeller arranged within the pump housing, the impeller being configured to pump blood when driven in rotation within the patient, wherein the pump unit is distal of the motor unit;
a flexible intermediate section arranged between the motor unit and the pump unit and that connects the motor housing to the pump housing, the flexible intermediate section comprising a flexible drive shaft; and
a cannula including a distal end, a proximal end, and at least one blood outflow aperture disposed at the proximal end of the cannula, the distal end of the cannula being coupled to the pump housing such that the cannula is configured to carry blood from the pump unit to the at least one blood outflow aperture when the impeller is driven in rotation within a patient,
wherein the flexible intermediate section and the motor unit are arranged within the cannula and the flexible intermediate section is bendable within the cannula to allow the motor housing and the pump housing to be on opposite sides of a bend relative to each other,
wherein the flexible drive shaft is configured to be driven in rotation by the motor, and to thereby drive the impeller in rotation.

2. The intravascular blood pump of claim 1, wherein the pump unit is configured to be compressible.

3. The intravascular blood pump of claim 2, further comprising a compression sleeve or compression catheter configured to maintain at least a portion of the pump unit in a compressed state.

4. The intravascular blood pump of claim 2, wherein the cannula is configured to be compressible.

5. The intravascular blood pump of claim 2, wherein the impeller is configured to be compressible.

6. The intravascular blood pump of claim 5, wherein the impeller is further configured to have a compressed state and a relaxed state, and to expand when the impeller is brought from the compressed state into the relaxed state.

7. The intravascular blood pump of claim 1, wherein the flexible intermediate section further comprises a sheath surrounding at least a portion of the flexible drive shaft.

8. The intravascular blood pump of claim 7, wherein the sheath comprises multiple layers.

9. The intravascular blood pump of claim 7, wherein the flexible intermediate section further comprises a helical wire bearing arranged within the sheath and wound around the flexible drive shaft.

10. The intravascular blood pump of claim 1, wherein the motor housing is formed at least in part of a magnetically conductive iron-chromium-aluminum alloy.

11. The intravascular blood pump of claim 1, wherein the motor housing is formed at least in part of a magnetically conductive cobalt-iron alloy.

12. The intravascular blood pump of claim 1, wherein the motor unit has a maximum outer diameter of 10 Fr.

13. The intravascular blood pump of claim 1, wherein the motor unit has a total length of between 14 and 16 mm.

14. The intravascular blood pump of claim 1, wherein the motor unit has a maximum external diameter and a total length, the maximum external diameter of the motor unit being between 0.20 and 0.24 of the total length of the motor unit.

15. The intravascular blood pump of claim 1, wherein the intravascular blood pump is an intravascular blood pump configured for use in a left heart.

16. The intravascular blood pump of claim 1, wherein the intravascular blood pump is an intravascular blood pump configured for use in a right heart.

17. The intravascular blood pump of claim 1, wherein the pump housing is a compressible blood inflow cage that surrounds the impeller.

18. The intravascular blood pump of claim 17, wherein the blood inflow cage includes a distal end and a proximal end, the distal end of the cannula is coupled to the blood inflow cage such that the distal end of the blood inflow cage is distal to and exterior to the distal end of the cannula and the proximal end of the blood inflow cage is disposed proximal of the distal end of the cannula and within the cannula.

19. An intravascular blood pump, comprising:
- a motor unit comprising a motor housing and a motor arranged within the motor housing, the motor unit being configured to be inserted into vasculature of a patient;
- a pump unit comprising a pump housing and an impeller arranged within the pump housing, the impeller being configured to pump blood when driven in rotation within the patient, wherein the pump unit is distal of the motor unit;
- a cannula including a distal end, a proximal end, and at least one blood outflow aperture disposed at the proximal end of the cannula, the distal end of the cannula being coupled to the pump housing such that the cannula is configured to carry blood from the pump unit to the at least one blood outflow aperture when the impeller is driven in rotation within a patient; and
- a flexible drive shaft arranged between the motor unit and the pump unit and that connects the motor housing to the pump housing, wherein the flexible drive shaft and the motor unit are arranged within the cannula and the flexible drive shaft is bendable within the cannula to allow the motor housing and the pump housing to be on opposite sides of a bend relative to each other,
wherein the flexible drive shaft is configured to be driven in rotation by the motor, and to thereby drive the impeller in rotation.

20. The intravascular blood pump of claim 19, wherein the impeller is configured to have a compressed state and a relaxed state, and to expand when it is brought from the compressed state into the relaxed state.

* * * * *